A. B. FOANS.
DEVICE FOR MOLDING BLOCKS.
APPLICATION FILED AUG. 31, 1917.
1,266,787.
Patented May 21, 1918.
2 SHEETS—SHEET 1.
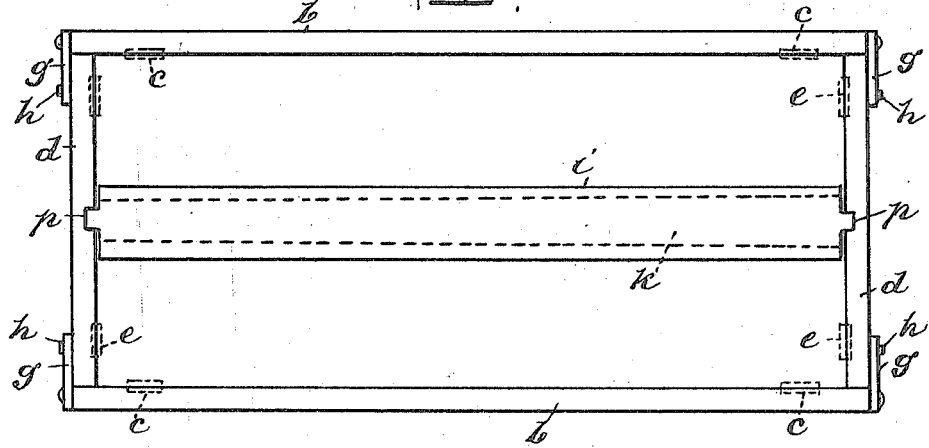
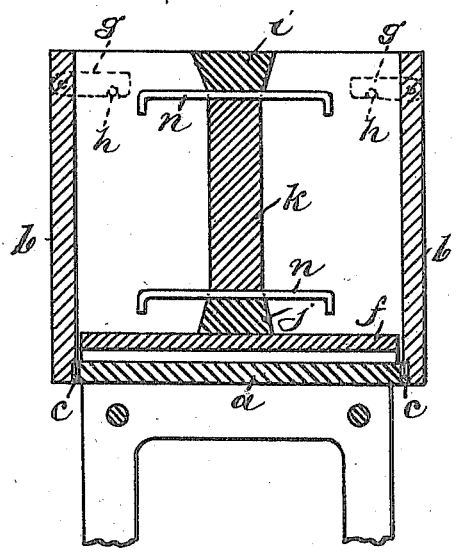
WITNESS:
Grace DeVoe.
INVENTOR
Andrew B. Foans
BY Hauff-Harland
ATTORNEYS

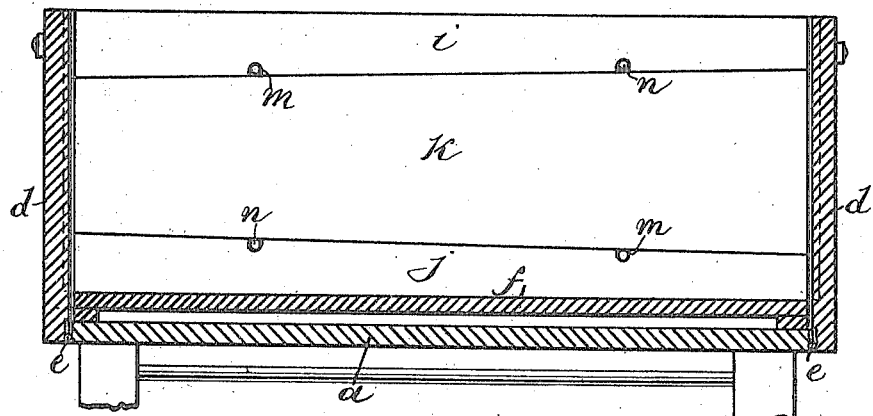
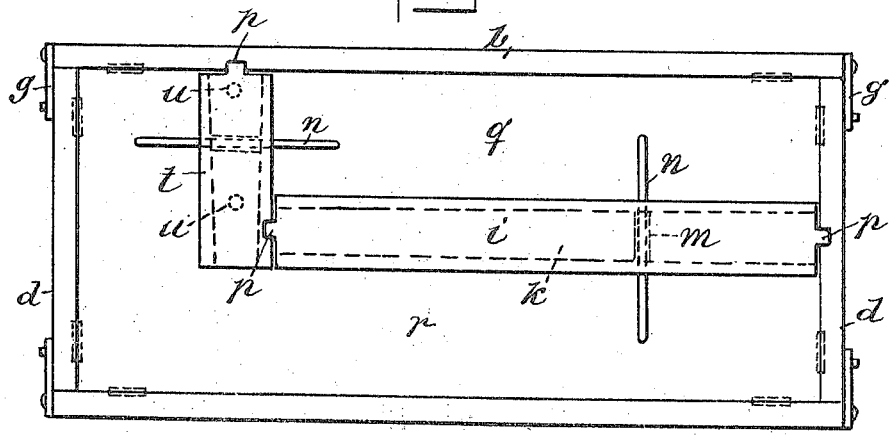
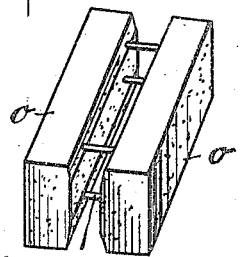
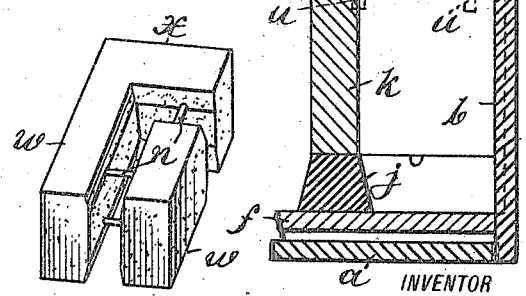

UNITED STATES PATENT OFFICE.

ANDREW B. FOANS, OF NEW YORK, N. Y.

DEVICE FOR MOLDING BLOCKS.

1,266,787.

Specification of Letters Patent.

Patented May 21, 1918.

Application filed August 31, 1917. Serial No. 189,101.

*To all whom it may concern:*

Be it known that I, ANDREW B. FOANS, a citizen of the United States, residing at New York, county of New York, and State of New York, have invented new and useful Improvements in Devices for Molding Blocks, of which the following is a specification.

This invention relates to a mold which is especially adapted for forming a concrete block consisting of two divided sections with a continuous air space and having tie rods for holding the sections together.

An object of the invention is to provide the mold with a removable core made to divide the mold into two compartments. The core is built up of three members, the tie rods being arranged to give clearance room to one of the members so that it can be slid endwise from the mold.

Another object of the invention is to provide the mold with an angular core for casting a return block having two spaced sections with a continuous air space and a series of tie rods embedded in the sections for holding them together.

The novel combinations of parts are more fully described in the following specification and claims and illustrated in the accompanying drawings in which:

Figure 1 represents a plan view of a mold embodying this invention.

Fig. 2 is a vertical transverse section of the same.

Fig. 3 is a longitudinal vertical section of Fig. 1.

Fig. 4 is a view like Fig. 1 showing an angular core arranged in the mold.

Fig. 5 is a detail vertical transverse section of the same.

Fig. 6 is a perspective view of a block.

Fig. 7 is a similar view showing an angular block.

In these drawings is shown a mold having a bottom *a* provided with side walls *b* swingingly connected at *c* to the bottom. The mold also includes end walls *d* swingingly connected at *e* to the bottom. This method of hinging the walls to the bottom permits the walls to be swung outward when it is desired to open or collapse the mold. A pallet *f* is positioned on the bottom to support the concrete. A number of latches *g* each being made to coact with a lug *h* will hold the walls in position to substantially form a case for shaping a concrete or other plastic block.

A core having a top section *i*, bottom section *j*, and intermediate section *k* is adapted to divide the mold into two compartments for receiving the plastic material. The upper and lower section extends the length of the mold and each is provided with recesses or notches *m* for receiving a number of tie rods *n* having portions extending from the sides of the sections to be embedded in the concrete. The intermediate section is preferably tapered and all the sections are beveled so that they can be easily drawn when desired. The tie rods are flush with the upper and lower edges of the section *k* as indicated in Fig. 3, so that the latter section can be easily drawn or slid endwise from the mold. The bottom section *j* can be fastened to the pallet and thus removed from the mold with the pallet.

As indicated in Figs. 1, 2 and 3 the core is constructed to mold a block of two parallelled divided sections *o* best seen in Fig. 6 with a continuous air circulating space. The tie rods *n* are positioned in two rows, one being in line with the other and their end portions are solidly embedded in the concrete to securely hold the sections together.

The core is assembled in the mold by placing the pallet with the section *j* on to the bottom, the lower set of tie rods are then set in the notches and the intermediate section *k* is placed on to the rods. The upper section *i* with its upper row of rods is placed on the outer edge of the intermediate section.

The plastic mixture can then be poured into the compartments and when the desired level is reached one of the end walls of the mold can be swung over and the top section *i* lifted off to permit the intermediate section to be slid outward. The pallet can then be readily removed with the block thereon and allowed to set while another block is molded. The three core sections have tongue and groove sliding connections *p* with the walls of the mold.

As indicated in Figs. 4 and 5, the mold is provided with angular core sections to divide the mold into a rectangular compartment *q* and an angular compartment *r* for receiving the concrete. The angular core sections comprehend a bottom member *s* secured to the pallet, a top member *t* and an intermediate member *u* forming a right angle transverse extension. The top $t$ is connected by means of dowel pins $v$ to the section $u$, so as to prevent shift of the section. The longitudinal cross sections of this construction are practically the same as those illustrated in Fig. 3. In this device, when it is desired to remove the block, the top sections $i$ and $t$ can be lifted off and the longitudinal section slid from the end $d$ of the mold. The intermediate transverse section $u$ can then be slid out of the side $b$ of the mold. This last named mold casts a return block shown in Fig. 7 which includes two parallel sections $w$, one of the sections having a right angle integral extension $x$ with a continuous angular air space between the sections. The tie rods $n$ are embedded in the material at suitable places as shown.

I claim:—

1. A device for forming concrete blocks comprising a mold, a sectional core arranged to divide the mold into compartments, said core including top and bottom recessed tie rod receiving sections, and an intermediate tapered section.

2. A device for forming concrete blocks comprising a mold having bottom, side and end walls swingingly connected to the bottom, a sectional core arranged to divide the mold into compartments, said core including top and bottom recessed tie rod receiving sections, and an intermediate tapered section.

3. A device for forming concrete blocks comprising a mold having a bottom, side and end walls swingingly connected to the bottom, a sectional core arranged to divide the mold into compartments, said core including top and bottom recessed tie rod receiving sections, and an intermediate tapered section made to slide from one end of the mold.

4. A device for forming concrete blocks comprising a mold having a bottom, side and end walls swingingly connected to the bottom, a sectional core arranged to divide the mold into two compartments one being angular, said core being in two parts including top and bottom recessed tie rod receiving sections, and an intermediate tapered section made to slide from one end of the mold.

5. A device for forming concrete blocks comprising a mold having a bottom, side and end walls swingingly connected to the bottom, a sectional core arranged to divide the mold into two compartments one being angular, said core being in two parts including top and bottom recessed tie rod receiving sections, intermediate sections adapted to slide endwise and at right angles relative to each other.

6. A device for forming concrete blocks comprising a mold having a bottom, side and end walls swingingly connected to the bottom, a sectional core arranged to divide the mold into angular compartments, said core being in two parts including top and bottom recessed tie rod receiving sections, intermediate sections adapted to slide endwise and at right angles relative to each other.

In testimony whereof I have hereunto set my hand in the presence of two subscribing witnesses.

ANDREW B. FOANS.

Witnesses:
 WILLIAM MILLER,
 JOHN A. BERGSTROM.

Copies of this patent may be obtained for five cents each, by addressing the "Commissioner of Patents, Washington, D. C."